United States Patent [19]

Haggerty

[11] 4,167,999

[45] Sep. 18, 1979

[54] CONVEYORS

[75] Inventor: Michael P. Haggerty, Stourport-on-Severn, England

[73] Assignee: Wall & Leigh Thermoplastics Limited, Wednesbury, England

[21] Appl. No.: 826,087

[22] Filed: Aug. 19, 1977

[30] Foreign Application Priority Data

Aug. 19, 1976 [GB] United Kingdom ............... 34547/76

[51] Int. Cl.² ........................................... B65G 17/06
[52] U.S. Cl. .................................... 198/851; 198/648
[58] Field of Search ............... 198/648, 793, 850–852, 198/817, 831; 74/245 R, 245 C, 245 LP, 245 P, 250 R, 250 C

[56] References Cited

U.S. PATENT DOCUMENTS

| | | | |
|---|---|---|---|
| 2,954,113 | 9/1960 | Hibbard et al. | 198/851 |
| 3,225,898 | 12/1965 | Roinestad | 198/852 |
| 3,285,395 | 11/1966 | Resener | 198/851 |
| 3,416,645 | 12/1968 | Jones | 198/852 |
| 3,913,726 | 10/1975 | Gray | 198/648 |
| 3,952,860 | 4/1976 | Specht | 198/850 |
| 3,991,876 | 11/1976 | Schmidt et al. | 198/831 |

FOREIGN PATENT DOCUMENTS 1011883 12/1965 United Kingdom ..................... 198/851

Primary Examiner—Joseph E. Valenza
Attorney, Agent, or Firm—Sughrue, Rothwell, Mion, Zinn and Macpeak

[57] ABSTRACT

A conveyor including at least two endless chains each comprising a plurality of pivotally inter-connected links, each link comprising a synthetic plastics material, having a conveying surface, and having attachment means whereby additional elements may be mounted thereon and at least some of the links in each chain being engageable by a drive means.

3 Claims, 2 Drawing Figures

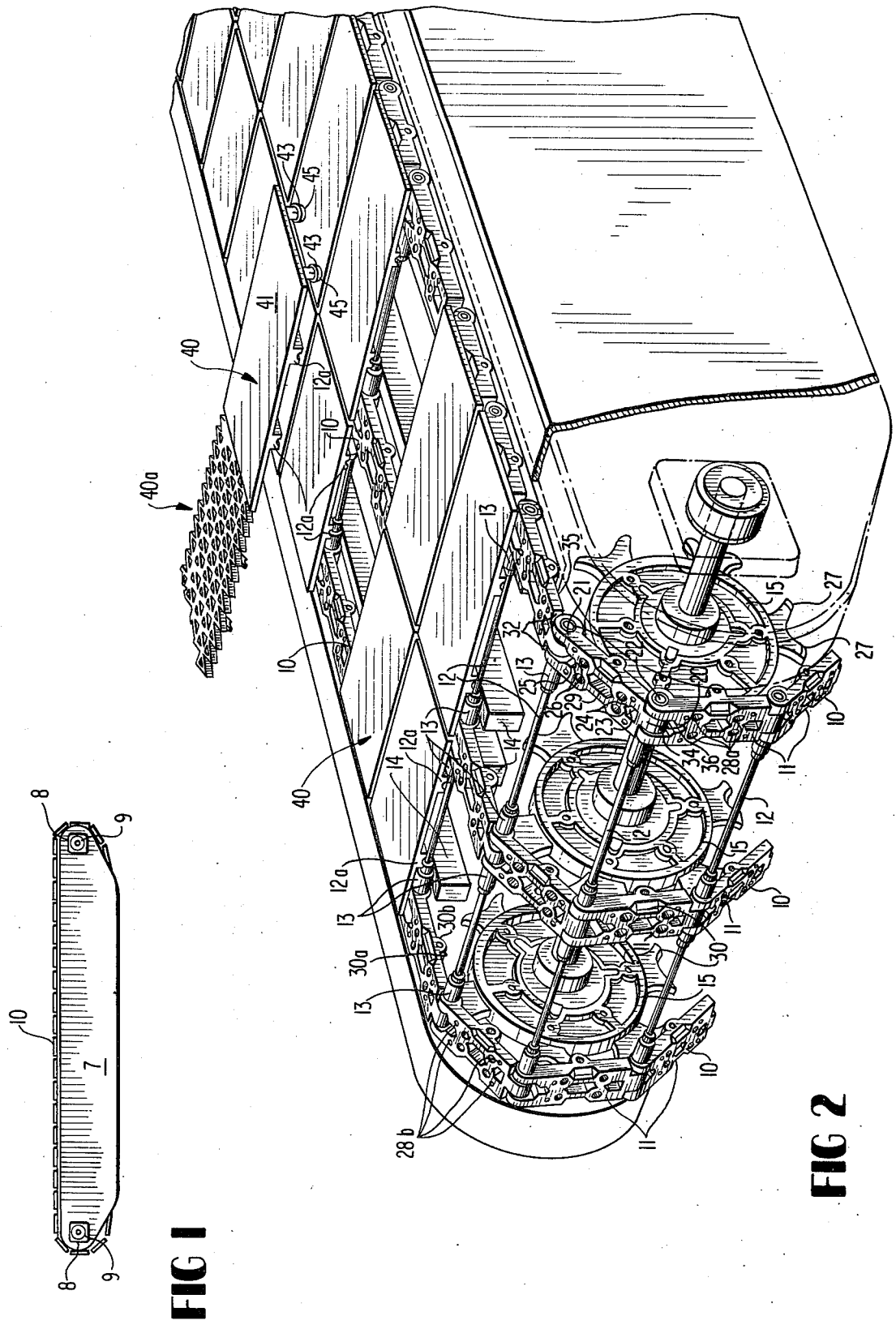

CONVEYORS

BACKGROUND OF THE INVENTION

1. Field of the Invention

This invention relates to conveyors.

2. Summary of the Invention

An object of the invention is to provide a new and improved conveyor.

According to one aspect of the present invention we provide a conveyor including at least two endless chains each comprising a plurality of pivotally interconnected links, each link comprising a synthetic plastics material, having a conveying surface, and having attachment means whereby additional elements may be mounted thereon and at least some of the links in each chain being engageable by a drive means.

The pivotally interconnected links transmit the whole of the driving, or tension, loading in the conveyor and the additional elements transmit no such load. Hence it is necessary for only the links to be made sufficiently strongly to accommodate such tension loading and the additional elements may be made of any suitable material. For example, the additional elements may be made of a material which, whilst it cannot accommdate the tension loading of the conveyor, it is more suitable for its intended purposes, for example the material may be a relative cheap material and hence leading to more economical production of the additional elements or, if relatively high frictional properties are required, the additional elements may be made of a rubber material which would provide the necessary frictional properties without having the strength which would be necessary to accommodate the tension loading of the conveyor.

Preferably, each link is of a one-piece construction, such as a moulding or an extrusion in synthetic plastics material.

The links may be pivotally interconnected by pivot pins which are received in passages formed in the links and the parts of the links in which pins are received may be engageable by the drive means. The drive means may comprise a suitably shaped sprocket.

At least some of the links may be provided with a plurality of apertures in which are received mounting means provided on the additional elements whereby the additional elements are mounted on the links.

The additional elements may be attachable and detachable by movement thereof only in a direction normal to the conveying surface and means for retaining the elements on the links may be provided said means being operable to secure and release the elements without disassembling the chain or gaining access to the under side thereof.

The additional elements may be provided with projections which snap inter-engage with the apertures in the links.

BRIEF DESCRIPTION OF THE DRAWINGS

The invention will now be described in more detail by way of example with reference to the accompanying drawings wherein:

FIG. 1 is a side elevation of a conveyor embodying the invention, and

FIG. 2 is a fragmentary perspective view of part of the conveyor of FIG. 1 to an enlarged scale.

DESCRIPTION OF PREFERRED EMBODIMENTS

Referring to the drawings there is shown a conveyor which comprises three endless chains 10 each comprising a plurality of links 11 which are interconnected by pivot pins 12. Mounted on the pivot pins 12 between each pair of chains 10 are four rollers 13 engaged between a link 11 and a pin engaging part 12a of additional elements 40 as hereinafter described in more detail.

The rollers 13 engage the upper surfaces of guide members 14 on the upper, or operative, run of the conveyor and guide members may be provided on the lower, or return run of the conveyor. The chains 10 are engaged with drive sprockets 15 carried on shafts 9 rotatably mounted in bearings 8 in conveyor side members 7.

If desired only some of the chains may be engaged by drive sprockets.

Each link 11 comprises a tongue portion 20 and a bifurcated portion 21. Passages 22 are formed in these portions to receive pivot pins 12. An aperture 23 is provided adjacent the tongue portion 20 and has inclined end surfaces 24. A recess 25 is formed at the inner end of the bifurcated portion 21 and is provided with inclined end surfaces 26 so that when the links are assembled there are provided similarly shaped apertures at each end of the link within which teeth 27 of the sprocket 15 can engage, the teeth being of a configuration to co-operate with the apertures thus formed.

Each link is also provided with four larger cylindrical passages 28a and four smaller cylindrical passages 28b. In addition there is a central passage 29, recessed side portion 30 and a recess, not shown, in its underside which accommodates a roller 30a carried on a pivot pin carried in trunnion parts 30b. The rollers 30a may engage further guide members similar to the members 14 but are primarily provided for use when the links are used to provide a single chain. If desired the rollers 30a can be omitted in a conveyor comprising two or more chains. For certain applications, rollers 30a could replace and perform the functions of rollers 13.

When the links are assembled, the end surface 34 of the tongue part 20 is closely adjacent to a shoulder 36 formed between the bifurcated part and the recess 25 whilst the end surface 35 of the bifurcated part 21 is closely adjacent to a transverse wall 32.

The links are made by moulding in suitable synthetic plastics material. Suitable materials include acetal, modified PPO, nylon, thermoplastic polyesters, polypropylene polycarbonate, polysulphones, polyphenylene sulphides; these first materials are suitable for use respectively in the following conditions, general purpose, steam, oil and grease high temperature, low cost, food, extra high temperature.

It will be appreciated that any suitable synthetic plastics material may be used so long as it has sufficient strength to accommodate the tension forces imposed upon the belt.

The upper surface of the links lies in a single plane and is thus suitable for conveying articles and hence comprises a conveying surface. Whilst in certain cases users of the present invention may wish to carry articles directly upon the links and they may also wish to provide additional elements of a configuration which is more suitable for conveying articles in a particular application concerned. Thus means are provided whereby additional elements may be mounted on the conveyor.

The additional elements may be of any desired configuration and can, for example, comprise a flat tray, or a dished tray, or a bucket and may have a perforated surface.

In one example an additional element 40 takes the form of a flat tray having a planar upper surface 41 and a plurality of reinforcing ribs depending from its undersurface. The additional element is also provided with four frusto-conical projections 43 provided with three perpendicular diametric slots and an enlarged head portion which provides a detent 45. In use, two of the projections 43 are engaged within two of the apertures 28a of a pair of links in adjacent belts with the enlarged head part 45 engaged under the undersurface of the link to retain the element in position. The additional elements are also provided with four downwardly projecting pivot pin engaging parts 12a which transmit load carried by the additional element to the pins, having a part cylindrical surface therein to engage the pins, and also to serve to locate the rollers 13 as described hereinbefore to maintain the belt spaced apart.

It should be appreciated, however, that a different pattern of apertures may be provided in the links and accordingly different attachment means provided on the additional elements. For example self tapping screws which may be engaged with the apertures 28b, or alternatively these apertures may be tapped to accept a standard screw.

Because the additional elements do not have to transmit any tension loading they may be made either of a low strength, and hence more economical, synthetic plastics material or of a material which is particularly suitable for the intended application. For example, if the conveyor has to convey articles up an incline, it will be desirable for the additional elements to have a high co-efficient of friction and thus they could be made of a suitable rubber material.

Although in this example three chains spaced apart by the rollers 13 and part 12a has been described it should be appreciated that any desired number of chains may be utilised from two upwards. The additional elements may span two or more chains and may be engaged with one or all of the chains which are spanned.

Although in this example the pivot pins have been described as extending transversely of all three chains, if desired separate pivot pins may be used for individual chains and the chains may be maintained in the desired spacing by means of the additional elements, by means of sprockets engaged with each chain or any other desired means. The pivot pins may be made of steel, plastics or any other suitable material.

Although in the present example the parts of the links which engage the sprockets are an integral part of the link, if desired the links may be formed so as to provide rollers engaged with the pivot pins for engagement with the sprockets.

Because the conveyor is made, except for the pivot pins, wholly in synthetics plastic material, it is of low weight, may be self-lubricating, has a high chemical resistance, and is of relatively low cost. In addition, maintenance of the conveyor is easy as it is merely necessary to replace a link if a link should happen to fail.

If desired, metal inserts, for example brass, may be provided in the links, the metal inserts being provided with a suitable attachment means such as a screw thread to permit alternative mode of securing the additional elements to the links.

If desired the additional elements may be of any other configuration such as a triangular grid as shown at 40a in FIG. 2 but provided with the same projections 43 and parts 12a as described hereinbefore. Also, if desired, the adjacent edges of adjacent additional elements may be provided with inter-leaved fingers particularly to avoid any risk of personnel's fingers being trapped between the adjacent edges. The conveyor may be caused to pass around a curve such that a concave surface is formed in the upper surface of the conveyor and in this case the adjacent edges or adjacent elements may be formed with a downwardly bevelled edge to accommodate this movement.

If desired the links may be used to form a single conveyor chain which may carry additional elements.

I claim:

1. A conveyor, comprising: two spaced parallel longitudinally extending side members, two drive sprockets at each of two positions spaced longitudinally of said side members, said drive sprockets at each position being mounted for rotation on a shaft supported on the side members and extending in a horizontal plane perpendicular thereto, two guide members extending parallel to the side members, two endless chains each comprising a plurality of pivotally interconnected links, each link having a length greater than its width, having a conveying surface lying in a single horizontal plane, a plurality of mounting apertures being formed in each link and extending through the link from said conveying surface to an under-surface of the link, a tongue provided at one end of each link and a recess at the other end thereof, the tongue of one link being received in the recess of an adjacent link, a pivot pin removably received in apertures formed in the tongue and side walls of the recess to connect the links together, drive apertures formed in each link adjacent the tongue and recess to receive teeth on said sprockets whereby the endless chains are entrained around the sprockets, means for supporting a roller on the undersurface of each link at a location to engage one of said guide members, an additional element having a length corresponding to that of a link and a width at least equal to the distance between the outer edges of said two adjacent chains releasably mounted on each link by spigots in snap engagement with said mounting apertures, whereby the additional element can be mounted on or released from the chain by movement in a direction towards or away from the links on which the additional elements are mounted, means defining a recess to provide a space between the link and the additional element at the side of the conveying surface of the link to permit introduction of a tool to facilitate removal of the additional element, and rollers associated with at least some of said links in engagement with said guide members to support said links on the guide members.

2. A conveyor according to claim 1, wherein each pivot pin extends between said two chains.

3. A conveyor according to claim 2, wherein on at least some of said pins a roller is provided in rolling engagement with an additional guide member.

* * * * *